(12) United States Patent
Nicholson, Jr.

(10) Patent No.: US 11,378,461 B2
(45) Date of Patent: Jul. 5, 2022

(54) TEMPERATURE MEASURING AND LOGGING SLIDE UTILIZING WISP

(71) Applicant: Barry Nicholson, Jr., San Antonio, TX (US)

(72) Inventor: Barry Nicholson, Jr., San Antonio, TX (US)

( * ) Notice: Subject to any disclaimer, the term of this patent is extended or adjusted under 35 U.S.C. 154(b) by 0 days.

(21) Appl. No.: 16/741,719

(22) Filed: Jan. 13, 2020

(65) Prior Publication Data

US 2021/0148765 A1    May 20, 2021

Related U.S. Application Data

(62) Division of application No. 15/987,869, filed on May 23, 2018, now Pat. No. 10,578,495.

(Continued)

(51) Int. Cl.
*G01K 1/02* (2021.01)
*G01K 1/024* (2021.01)
(Continued)

(52) U.S. Cl.
CPC ............ *G01K 1/024* (2013.01); *B01L 3/54* (2013.01); *B01L 3/545* (2013.01); *B01L 9/52* (2013.01);
(Continued)

(58) Field of Classification Search
CPC .......... G01K 1/024; G01K 1/143; G01K 3/10; G01K 7/223; G01K 1/022; G01K 1/08; G01K 1/14; G01K 7/01; B01L 3/545; B01L 2200/147; B01L 3/508; B01L 2300/021; B01L 2300/022; B01L 2300/025; B01L 2300/0627; G02B 21/34;
(Continued)

(56) References Cited

U.S. PATENT DOCUMENTS 6,275,157 B1 * 8/2001 Mays ................ G07C 5/085
340/572.5
7,292,147 B2 * 11/2007 Benedikt ............ G06K 19/042
340/572.1

(Continued)

FOREIGN PATENT DOCUMENTS

DE     102004064072 B4 *  6/2020   ....... G01N 35/00029

*Primary Examiner* — Gail Kaplan Verbitsky
(74) *Attorney, Agent, or Firm* — Eric A. Hinojosa

(57) ABSTRACT

This disclosure describes a slide comprising a substrate, a WISP, and a temperature sensor, wherein the slide is capable of communicating with an external communications device via the WISP. In some implementations, the WISP comprises an antenna, an integrated circuit, and a memory unit, that are powered wirelessly by an external device, such that it is capable of measuring, logging, and communicating data. The data, such as time and temperature, may be collected via sensors connected to the WISP. In some implementations, the WISP and temperature sensor are embedded in the substrate to prevent direct contact with mounted specimens. In some implementations the slide further comprises displayed content. In some implementations, the displayed content is linked to a database of information. The various implementations of this invention may describe a slide utilizing any number of the features described above in any combination.

15 Claims, 6 Drawing Sheets

Related U.S. Application Data

(60) Provisional application No. 62/059,739, filed on May 23, 2017.

(51) Int. Cl.
| | |
|---|---|
| *G01K 3/10* | (2006.01) |
| *B01L 3/00* | (2006.01) |
| *B01L 9/00* | (2006.01) |
| *G01K 7/22* | (2006.01) |
| *G01K 1/143* | (2021.01) |
| *G02B 21/34* | (2006.01) |
| *G06K 19/077* | (2006.01) |

(52) U.S. Cl.
CPC ............... *G01K 1/143* (2013.01); *G01K 3/10* (2013.01); *G01K 7/223* (2013.01); *B01L 3/508* (2013.01); *B01L 2200/147* (2013.01); *B01L 2300/021* (2013.01); *B01L 2300/022* (2013.01); *B01L 2300/025* (2013.01); *B01L 2300/0627* (2013.01); *G02B 21/34* (2013.01); *G06K 19/07758* (2013.01)

(58) Field of Classification Search
CPC ....... G06K 19/007758; G06K 19/0723; H01Q 1/2225; H01Q 1/243
USPC ...................................... 116/216; 340/870.17
See application file for complete search history.

(56) References Cited

U.S. PATENT DOCUMENTS

| | | | | |
|---|---|---|---|---|
| 9,501,697 | B2* | 11/2016 | Rosset | B42D 25/364 |
| 10,302,665 | B2* | 5/2019 | Reinhardt | B01L 9/52 |
| 2011/0291807 | A1* | 12/2011 | Law | G06K 19/0723 |
| | | | | 374/178 |
| 2013/0265134 | A1* | 10/2013 | Gengel | H01L 24/82 |
| | | | | 29/601 |
| 2015/0317896 | A1* | 11/2015 | Planton | G08B 21/182 |
| | | | | 340/584 |
| 2016/0007508 | A1* | 1/2016 | Wilczynski | H05K 9/002 |
| | | | | 361/816 |
| 2016/0026222 | A1* | 1/2016 | Deng | G06F 3/041 |
| | | | | 359/894 |
| 2016/0310730 | A1* | 10/2016 | Martins | A61N 1/36031 |
| 2021/0394172 | A1* | 12/2021 | Crum | G01N 35/10 |

\* cited by examiner

TEMPERATURE MEASURING AND LOGGING SLIDE UTILIZING WISP

CROSS-REFERENCE TO RELATED APPLICATIONS

This application claims the benefit of a previous application, provisional patent application 62/509,739, filed on May 23, 2018, and nonprovisional patent application Ser. No. 15/987,869, which itself also claims the benefit of said provisional patent application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE DISCLOSURE

In many research and medical applications specimens are mounted on slides. It is known in the scientific and medical fields that slides are small rectangular plates—made of glass or other rigid and transparent materials—that are used for receiving and holding a target sample for use with a scientific or medical instrument such as a microscope. Often, the control of the temperature of the slide is of critical importance to the observation process. For that reason many instruments that handle the slide often rely on a temperature controlled surfaces. An example of such an instrument is an automated immunohistochemistry (IHC) slide stainer with a heated slide pad. For those instruments, independent temperature validation is commonly required to ensure proper functioning of the slide mount heat pad. In fact, for many US labs a failure to maintain accurate logs of independent temperature validation can result in fines, penalties, or loss of certification.

However, the slide and the mounted specimen typically experience other critical temperature exposures prior to interacting with those instruments. At any of these other exposures, there is the chance of negative consequences. For example, an elevated temperature exposure can alter, compromise, or even destroy the specimen mounted on a slide. Sometimes, the changes and/or damage may be falsely attributed to the specimen resulting in false data being observed and used for the work to which the specimen was provided. In a medical lab, the temperature error may lead to misdiagnosis or a failure to diagnose a tissue sample.

Yet, presently pathologists have no way of knowing with any certainty the range of temperatures the patient's tissue has been exposed to. Similarly, pathologists are unaware of the duration of time the tissue has been exposed to those temperatures.

To illustrate the potential for damaging temperature exposures take as example a typical chain of custody followed in clinical pathology laboratories: 1) a bulk tissue specimen is received by a lab tech known as a histotech, 2) the specimen is accessioned, 3) the specimen is grossed, 4) the specimen is processed, 5) the specimen is embedded in paraffin, 6) the specimen is frozen, 7) the specimen is cut into sections approximately three to four microns thick or as requirements dictate, 8) the specimen is placed into a heated water bath, 9) the specimen sections are mounted onto microscope glass slides, 10) the specimen is dried in an oven, 11) the routine or advanced staining procedures are applied to the specimen, and finally 12) the specimen is transferred to a pathologist for observation and analysis.

During every stage of this process the temperature and duration of exposure are critical because the morphology or biochemistry of the tissue can be greatly altered by a failure to observe the proper protocol required of that process. Some stages are particularly ripe for errors or temperature related damages to the specimen. Note for example that a typical water bath is heated to a point in the range of approximately 45-55° F. If the water bath is too hot, the tissue will explode across the water bath. Similarly, even within a normal range of temperature if the tissue is left on the water bath for too long then the tissue will expand thus dramatically altering the morphology. Morphology changes are extremely impactful on any procedure or observation made downstream in the custody chain.

Another step with a high potential for thermal damage occurs in the drying process. After the histotech completes the microtomy process (slicing the bulk specimen into a mountable slice, warming it in the water bath, and mounting the slice to a slide) the slides are placed into a conventional drying oven. This oven helps remove excess water from underneath the tissue sections while improving the adhesion between the patient's tissue and the glass slide thus reducing the potential for the specimen tissue washing off the slide during the staining process (which can be extensive—the IHC process can range from approximately one and a half hour to eight hours). This step also pre-melts the paraffin within and around the tissue specimen. The oven temperature is typically set between 60-65° C. However, it is common for histotechs to place the slide into the drying oven beyond the recommended time due to a range of issues such as other work demands, distractions, negligence, forgetfulness, extended bathroom breaks, etc. This drying oven temperature and the amount of exposure time is critical because it can mimic HIER (Heat Induced Epitope Retrieval) especially if set too high. Also, if the slide sits in this oven too long then the specimen tissue will begin to bubble (similar to boiling) which causes the tissue to lift off of the glass thus changing the morphology.

The pathologist may have requested one or multiple routine staining procedures (e.g. Hematoxylin & Eosin Staining, also known as H&E staining). The Pathologist may have also or alternatively requested one or multiple advanced stains (e.g. IHC). The desired staining may require manual staining or the use of an automated IHC slide stainer, following the completion of the oven drying step. Each temperature setting or program is preselected through a custom written protocol that is specific to each stain. Regardless of the type of preparation, procedure, or test each slide will come in direct contact with a variety of temperatures.

A pathologist questioning the preparation of a specimen will find the temperature history extremely useful to understanding the specimen's characteristics. Unfortunately, no slide exists that can track the temperature over time and communicate a log of that information in real time or store it for later access. The following invention relates to a new slide product that addresses this concern and others (such as ease of tracking, identification, and accountability).

BRIEF SUMMARY OF THE DISCLOSURE

It is a goal of the present invention to provide a temperature measuring and logging slide of both standard and non standard dimensions for use in a variety of applications and on a wide variety of slide-using instruments.

The disclosed slide is a new advancement in patient safety, specimen tracking and performance metrics analysis within the medical and research lab industry. The disclosed slide will provide an accurate record of all encountered temperatures, the length of time exposed to a temperature and a unique identifier for the user handling the specimen.

The disclosed slide can be used in any situation in which accurate temperature measuring and history for the slide is desirable for the user, without compromising the basic quality and use of the slide as a mounting medium for observation of specimens.

It is a further goal in some implementations to enhance the user's ability to track and identify the slide by means of a wireless identification and sensing platform (WISP) inlay to provide wireless communications and data capture via sensors. The WISP is capable of using Bluetooth and other wireless communications standards and protocols.

It is a goal of the present invention to increase the ease of use and the ease of record logging by featuring a slide that comprises a WISP that captures data and is capable of wirelessly communicating that data so that it can be entered into the quality control maintenance logbook or some other data storing platform of the user's preference.

It is a goal of the present invention to increase the durability and reduce the failure rate of the slide by featuring WISP inlay that is at least partially or wholly embedded within the substrate. It is another goal of the present invention to describe an alternate implementation of the present invention wherein the WISP is attached to the substrate slide as an adhesive label.

BRIEF DESCRIPTION OF THE SEVERAL VIEWS

DETAILED DESCRIPTION OF THE DISCLOSURE

Figure 1:
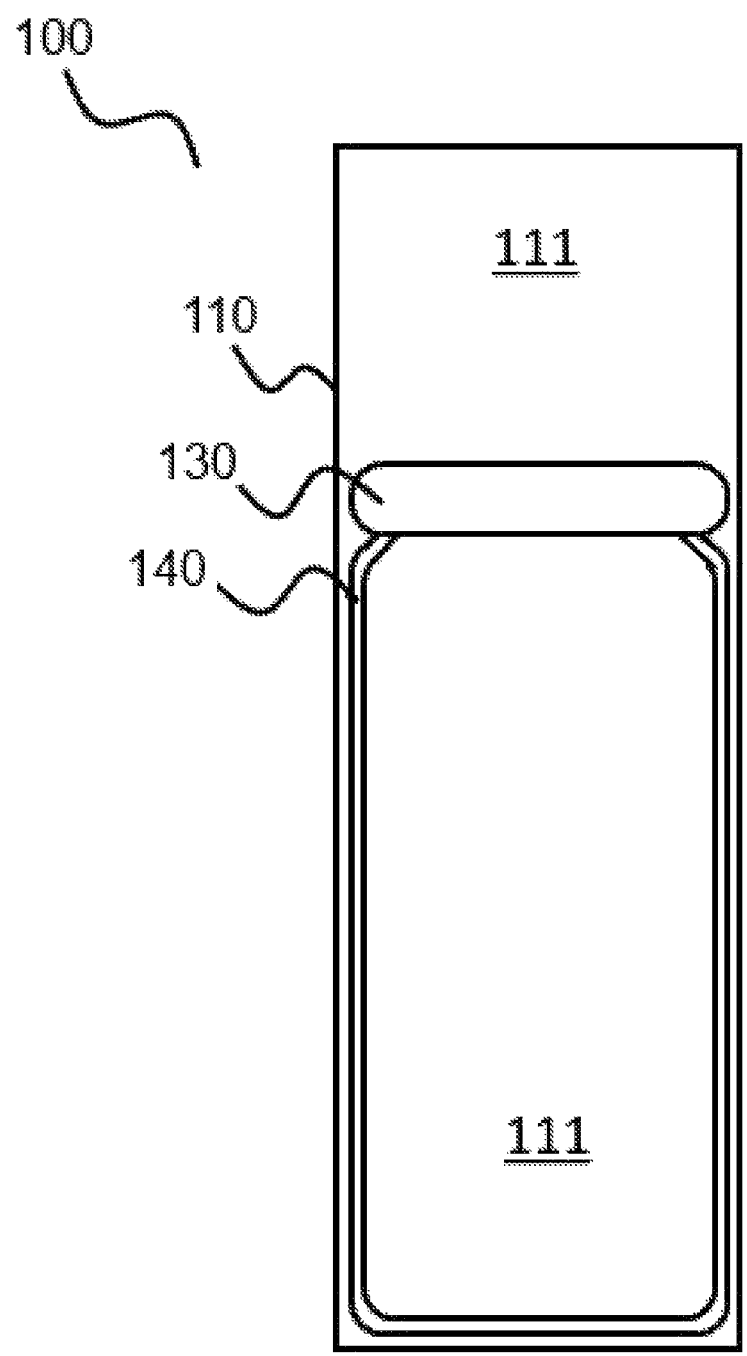
FIG. 1 depicts an orthogonal view of a first implementation of the temperature measuring and logging slide.

Detailed descriptions of the invention will be provided by way of alternative examples and implementations. These are not meant to confine, restrict, or otherwise limit additional implementations that are readily ascertainable from the present disclosure to one having ordinary skill in the art.

For example, in the Clinical Pathology field the disclosed slide can enter the process at the histotech's cutting station also known as their microtomy station. The histotech will activate each disclosed slide, wirelessly, via an electronic device capable of receiving signals from and communicating with the slide. The said electronic device can be located at the microtomy station. The histotech will then enter the disclosed slide partially into a water bath to mount a specimen to the slide. The disclosed slide will record this temperature and the length of time of the exposure. Similarly, the disclosed slide will capture the temperature and the length of time of the exposure to the oven temperatures used in the drying process. In some implementations, the slide can trigger an audio or visual alarm if the slides are exposed to the oven temperature beyond the predetermined timeframe or beyond the predetermined temperature limit. The water bath and the drying oven are two of the most critical temperature exposures, but the disclosed slide can capture the time and temperature before, between, during, and after those events to give a complete temperature history of the mounted specimen.

In the various implementations described below and throughout the disclosure the slide may be described as comprising a wireless identification and sensing platform (WISP). The reader should note that for the purpose of simplification, WISP components have been illustrated as simple boxes in the drawings. However, it will be readily understood and appreciated by one having ordinary skill in the art that a WISP device actually comprises multiple components such as an antenna and a micro chip.

A first and basic implementation of the temperature measuring and logging slide of the present disclosure, herein referred to as slide 100, comprises a rigid body referred to as substrate 110, a WISP 130, and a temperature sensor 140. A user of the slide will need an external communications device capable of communicating with the WISP, such as external communications device 101 of slide 100.

The substrate is preferentially comprised of glass. The glass may be selected from a variety of glass types known and used in the slide manufacturing industry. However, a preferred type of glass used in some implementations—that is not commonly used in slides—is laminated (shatter proof) glass. Another preferred type of glass used in some implementations—that is not commonly used in slides—is tempered glass. Regardless of the material of composition, the selected material of the slide should be selected to maintain the functional properties inherent to slides, namely rigidity and transparency.

The substrate 110 shape is a substantially flat regular rectangular prism. Rectangular prisms have six faces forming the outer surface, of which at least four are rectangles. In some implementations, the substrate has dimensions known in the industry as standard slide dimensions. In other implementations the substrate has nonstandard dimensions compared to the industry standard dimensions. It will be understood upon reading the present disclosure that the substrate can have alternative shapes, including non-rectangular prisms and prisms with non-polygonal perimeters.

Still discussing slide 100 seen in FIG. 1, substrate 110 has an upward facing outer surface area 111. The WISP 130 and the temperature sensor 140 are visible within substrate 110 (which is transparent). However, the upward facing outer surface area 111 is unbroken and continuous across substrate 110 in slide 100.

Figure 2:
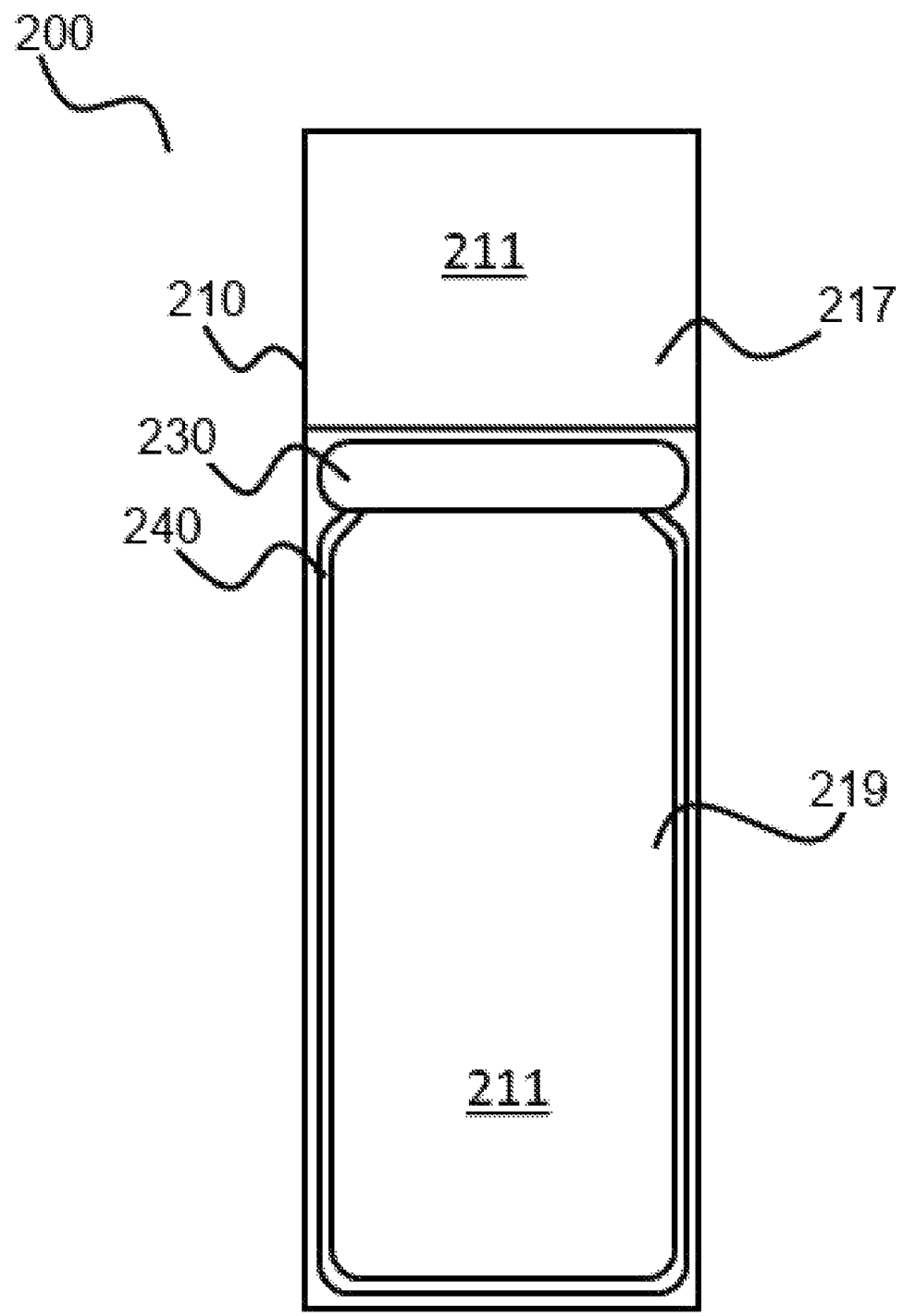
FIG. 2 depicts an orthogonal view of a second implementation of the temperature measuring and logging slide.

In contrast to slide 100, some implementations feature a substrate further comprising an upward facing outer surface area that is divided into two areas—a first and second surface area—wherein a first surface area is distal to and does not include the center of the substrate's upward facing outer surface area, and a second surface area does include the center and the opposite distal end of the substrate. For reference see slide 200 seen in FIG. 2. Slide 200 is similar to slide 100, but is further comprising an upward facing outer surface area 211 that is divided into a first surface area 217 and a second surface area 219.

In some related subsets of implementations such as slide 200, the first surface area is rendered translucent while the second area is as optically transparent as the substrate properties allow. In some implementations where the substrate comprises glass, the first surface area is frosted, which is accomplished by any suitable means such as physical abrasion (via sandblasting for example) or chemical etching (via acid wash for example). The first surface area in those implementations provides the user with a convenient place to more securely grip and handle the measuring and logging slide. In other implementations, the first surface area is colored. In those implementations the first surface area is more readily seen compared to the second surface area and the color can be used to convey a meaning to the user (for example class, use, or type identification). The goal of such an implementation is to comprise a substrate that closely replicates the outer composition and physical dimensions of the slides that are typically used by the user.

In some implementations the WISP of the slide is further comprising an integrated circuit and an antenna for passive radio frequency identification. In other implementations the WISP of the slide is further comprising an integrated circuit, a power source (such as a battery, solar cell, thermo-cell, capacitor, or a separate UHF WISP device), and an antenna for active radio frequency identification. In other related implementations the WISP of the slide is further comprising an integrated circuit, a power source (such as a battery, photovoltaic cell, thermoelectric device, capacitor, or some combination of those and other well known sources for example), a memory unit, and an antenna for active radio frequency identification. In another related implementation the integrated circuit and radio antenna are optimized for Bluetooth and other wireless communication standards. A hospital or other facility can use the wireless communications of the slide to better identify, manage, track, and locate the slide and other information related to the slide. The wireless communication could be used to allow the user to receive alerts or other communications from the slide via mobile phones, computers, or lab communications equipment capable of communicating with the slide.

In another implementation, the WISP of the slide is further comprising a light emitting electronic component, such as an LED. In another implementation, the WISP of the slide is further comprising a sound emitting electronic component, such as a speaker. In another implementation, the WISP of the slide is further comprising a sound receiving electronic component, such as a microphone. In another implementation, the WISP of the slide is further comprising a vibration creating electronic component, such as an unbalanced weight on a motor. In another implementation, the WISP of the slide is further comprising a display screen capable of displaying electronic or chemically created images. These various additional components can be programmed to communicate relevant information in the form of alerts, status indications, or identifying indicia.

The volume of the substrate of the certain implementations having a substantially regular rectangular prism is defined by six outer surfaces. As mentioned previously, there is an upward facing outer surface area. There is also a downward facing outer surface area. The upward facing and downward facing surface areas are connected by a top short edge, a right long edge, a bottom short edge, and a left long edge (described moving clockwise along the edge while viewing the upward facing outer surface area).

Figure 3:
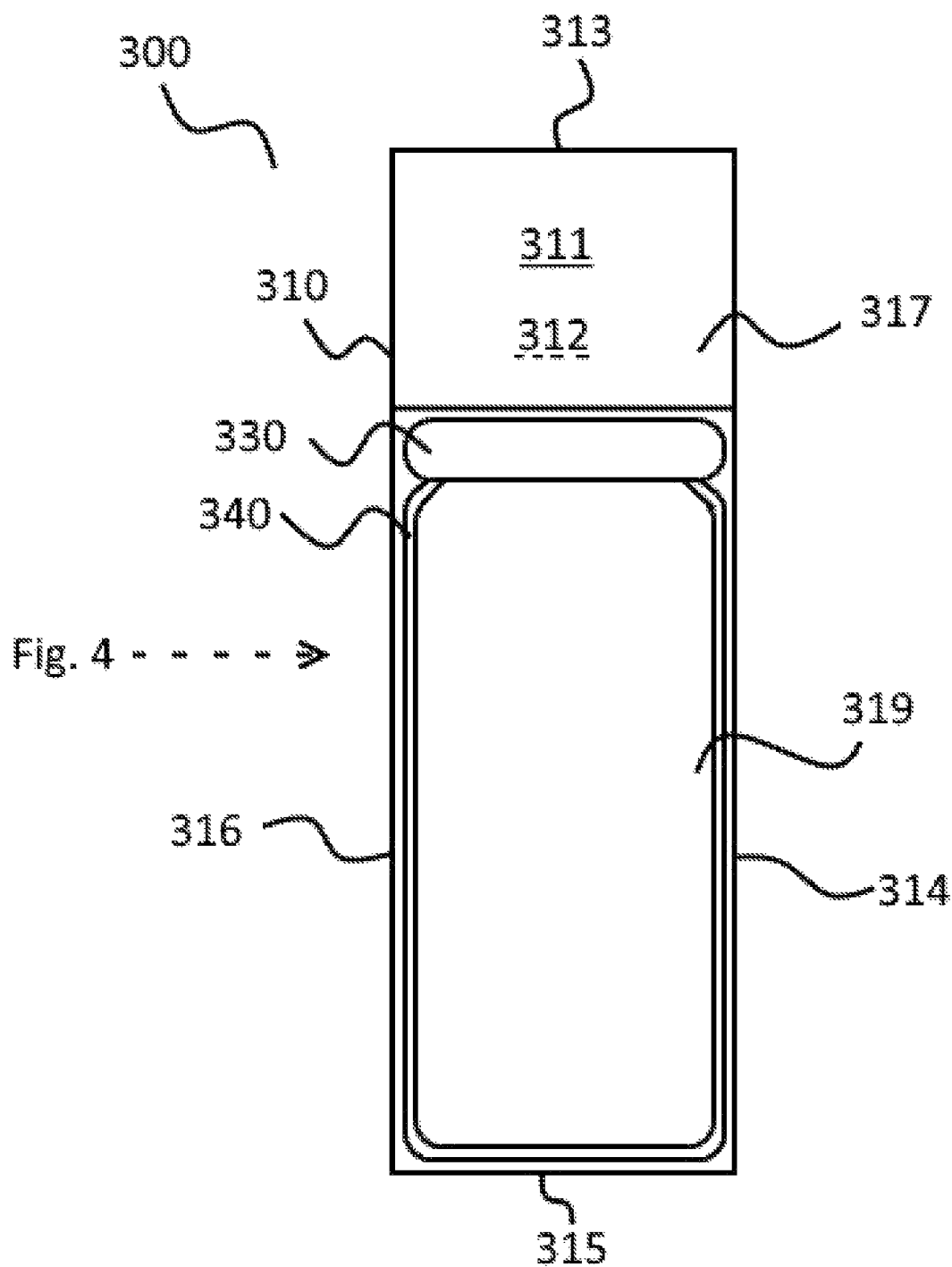
FIG. 3 depicts an orthogonal view of a third implementation of the temperature measuring and logging slide.
Figure 4:
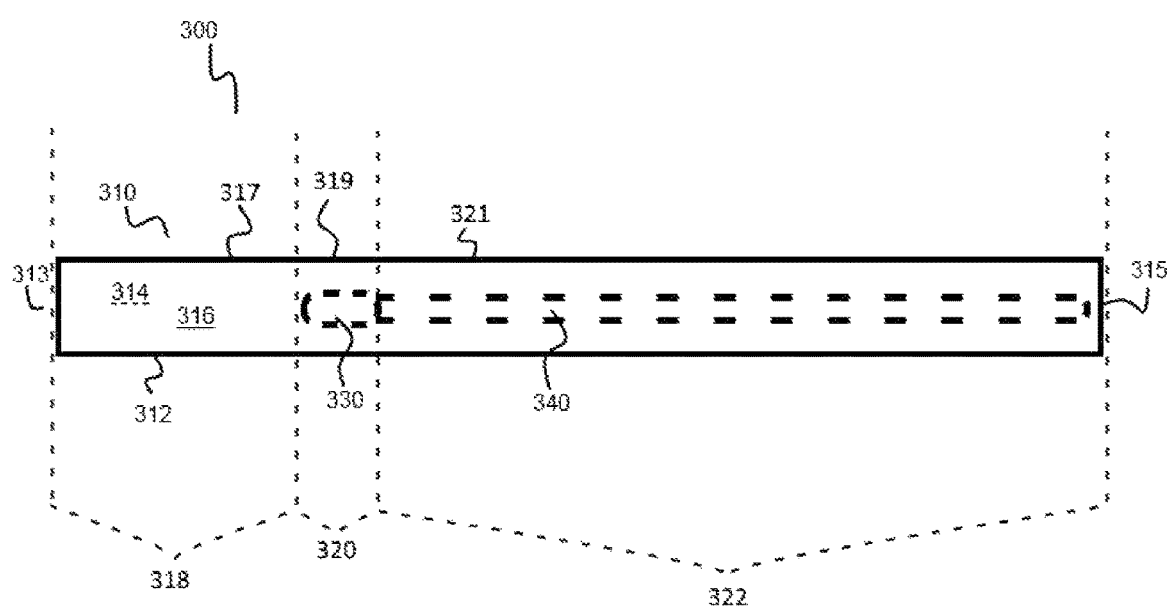
FIG. 4 depicts an orthogonal view of a side of the third implementation of the temperature measuring and logging slide.

See another implementation, referred to as slide 300, in FIG. 3 and FIG. 4, which show slide 300 is further comprising six outer surfaces identified as an upward facing outer surface area 311, a downward facing outer surface area 312, a top short edge 313, a right long edge 314, a bottom short edge 315, a left long edge 316. The position indicating terms used are relative to the position and orientation of the slide as depicted in FIG. 3.

In some implementations, such as seen in slide 300, the WISP is entirely embedded within the six outer surfaces of the substrate of the slide. See FIG. 4 for a side view of slide 300, though note that the dimensions are not intended to be to scale as the drawing has been optimized for ease of understanding the relative relationships of the components. In other implementations, the WISP is at least partially embedded within the six outer surfaces of the substrate. In some implementations, the substrate volume is divided into three connected segments. There is a first segment defined by a first surface area on the upward facing outer surface. There is a second segment defined by a second surface area on the upward facing outer surface. There is a third segment defined by a third surface area on the upward facing outer surface. The second segment is between and connects the first and third segments. The third segment is the largest and extends from the bottom short edge of the substrate to the second segment. The third segment also includes at least the center of the substrate. The first segment extends from the top short edge of the substrate to the second segment. In some implementations, the WISP is positioned at least partially within the first segment. In some implementations, the WISP is positioned entirely within the second segment. For example, while the WISP 330 of slide 300 appears wholly contained within the second segment of the substrate 310 volume, upon reading the present disclosure, it will be understood by one having ordinary skill in the art that a WISP, comprising multiple components such as an antenna and a micro chip may be positioned within the substrate of another implementation such that the antenna, which is usually coiled or snaked, can be positioned in the first segment of the substrate.

In some implementations, the temperature sensor is at least partially embedded within the six outer surfaces of the substrate. In some implementations, such as slide 300, the substrate volume is divided into three connected segments. See FIG. 4 for reference. Slide 300 further comprises a first segment 318 defined by a first area 317 on the upward facing outer surface 311; a second segment 320 defined by a second area 319 on the upward facing outer surface 311; and a third segment 322 defined by a third area 321 on the upward facing outer surface 311. The second segment 320 is between and connects the first and third segments. The third segment 322 is the largest and extends from the bottom short edge 315 of the substrate 310 to the second segment 320. The third segment 322 also includes at least the center of the substrate 310. The first segment 318 extends from the top short edge 313 of the substrate 310 to the second segment 320. In some related implementations, the temperature sensor is positioned within the second segment. In other related implementations, the temperature sensor is positioned at least partially within the second segment. In still other related implementations, the temperature sensor is positioned within the third segment. In some implementations, the temperature sensor partially runs substantially along the right long edge, the bottom short edge, and the left long edge, but stays inside of the substrate volume. In other related implementations, the temperature sensor is at least partially outside of the substrate volume. In other implementations, the temperature sensor partially runs substantially along the right long edge and the bottom short edge. In other implementations, the temperature sensor partially runs substantially along the right long edge. In other implementations, the temperature sensor partially runs substantially along the left long edge. In other implementations, the temperature sensor partially runs substantially along the left long edge and the bottom short edge.

In the various implementations described in this disclosure, the temperature sensor has been described and depicted as a long thin filament that while embedded in the substrate essentially follows a substantial portion of the internal substrate perimeter. In some implementations, the temperature sensor takes different shapes, configurations, and positioning. Having read the present disclosure, one having ordinary skill in the art will then understand that the WISP antenna may similarly be positioned partially along the internal perimeter of the substrate, while either still fully or at least partially embedded.

An advantage of embedding the WISP and temperature sensor, even if only partially so as some implementations may be, is that they will not make direct contact with the mounted specimens, thereby eliminating any concerns about unwanted chemical and physical interactions interfering with the specimen mounted on the slide. However, in related implementations, the WISP is integrally formed into a label and then attached to an outer surface of the substrate. In those implementations, the label will be optimized to prevent or reduce chemical interactions with specimens, specimen preparation agents, and optical interference.

An advantage of keeping the temperature sensor positioned towards the edge of the substrate is that it will not interfere with microscopic observations and lighting. An advantage of making the temperature sensor sufficiently long to be positioned along at least one long edge (either the right or left long edge) of the substrate is that it gives a more accurate measure of the temperature across the slide. In a preferred implementation, the temperature sensor is positioned adjacent to the center of the substrate so that it is measuring near to the specimen but without being too close and causing interference with the viewing of the specimen.

The temperature sensor is connected to the WISP. In some implementations, the WISP uses the temperature sensor to detect the temperature. In some related implementations, the temperature and time data are processed by the integrated chip of the WISP and stored in the memory unit. In other related implementations, the stored data are transmitted wirelessly via the radio antenna of the WISP.

In some implementations, the information is at least partially stored on a memory unit external to the slide. In those implementations, the information can be accessed by an authorized user using the specific identifier information of the slide. In some implementations, the information is at least partially stored online and accessed by the user by communicating with the slide using a device equipped with an internet connection, such as a smart phone, tablet, or similar computer device.

In some implementations, the information collected and stored in a memory unit of the WISP comprises temperature data, time data, and user access data. The user access data can include the current user with custody of the slide, when the user accessed data, when the user communicated with the WISP, and other similar information and data. In some related implementations, the data further comprises user access credentials. In some related implementations, the data further comprises equipment access data.

In some implementations, the slide is programmed, using software, to generate reports that are customized to the application. In related implementations, the report relates to the chain of custody accessioning, grossing, and processing.

In further related implementations, the temperature data corresponding to those events will be reported. In yet further related implementations, secondary analysis of the data will result in automatic warnings or alerts in the report based on anomalous data and data points that fall outside of preset thresholds.

In some implementations, the slide can be turned on or off by the user to preserve operational lifespan of the power source. In some implementations, the WISP enters a passive WISP communication state not requiring an internal power source. In other implementations, the WISP enters a low power state to conserve power by minimizing drawing from the power source, while maintaining an active WISP communication state. In some implementations, the user can selectively activate and deactivate data collection. For example, in some related implementations, the user can toggle the temperature and/or time measuring and/or logging function between an on state and an off state. In some implementations, the power for the sensors and electronic components of the WISP is delivered wirelessly and harvested from a UHF WISP reader. In some implementations, the source of the UHF signal from which power is harvested is also the same device that is capable of receiving the wireless data transmissions from the slide.

Figure 5:
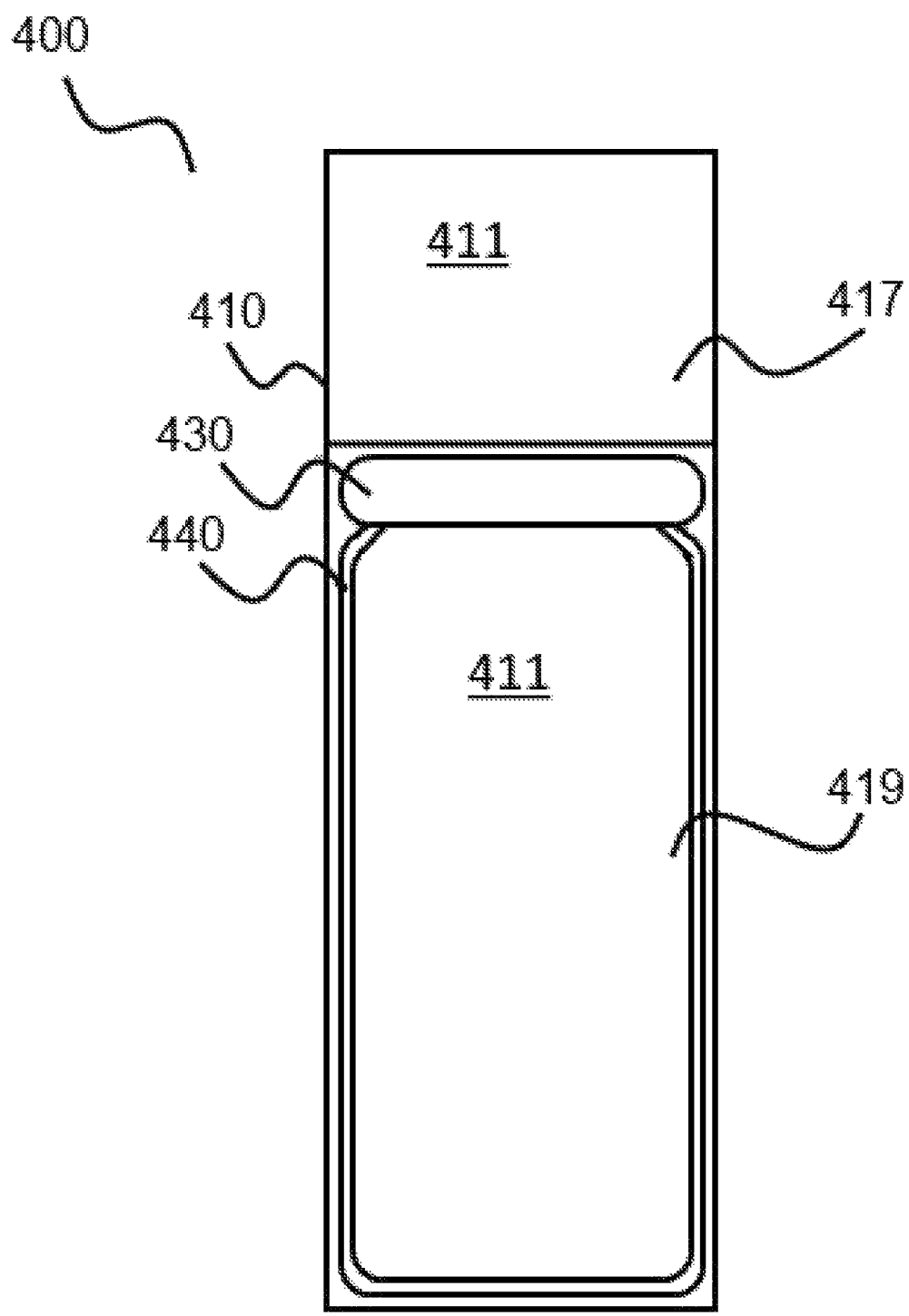
FIG. 5 depicts an orthogonal view of a fourth implementation of the temperature measuring and logging slide.

FIG. 5 shows another implementation similar to slide 200, referred to as slide 400, in which the slide 400 comprises substrate 410, WISP 430, and temperature sensor 440. Substrate 410 has an upward facing outer surface area 411, a first surface area 417, and a second surface area 419.

Figure 6:
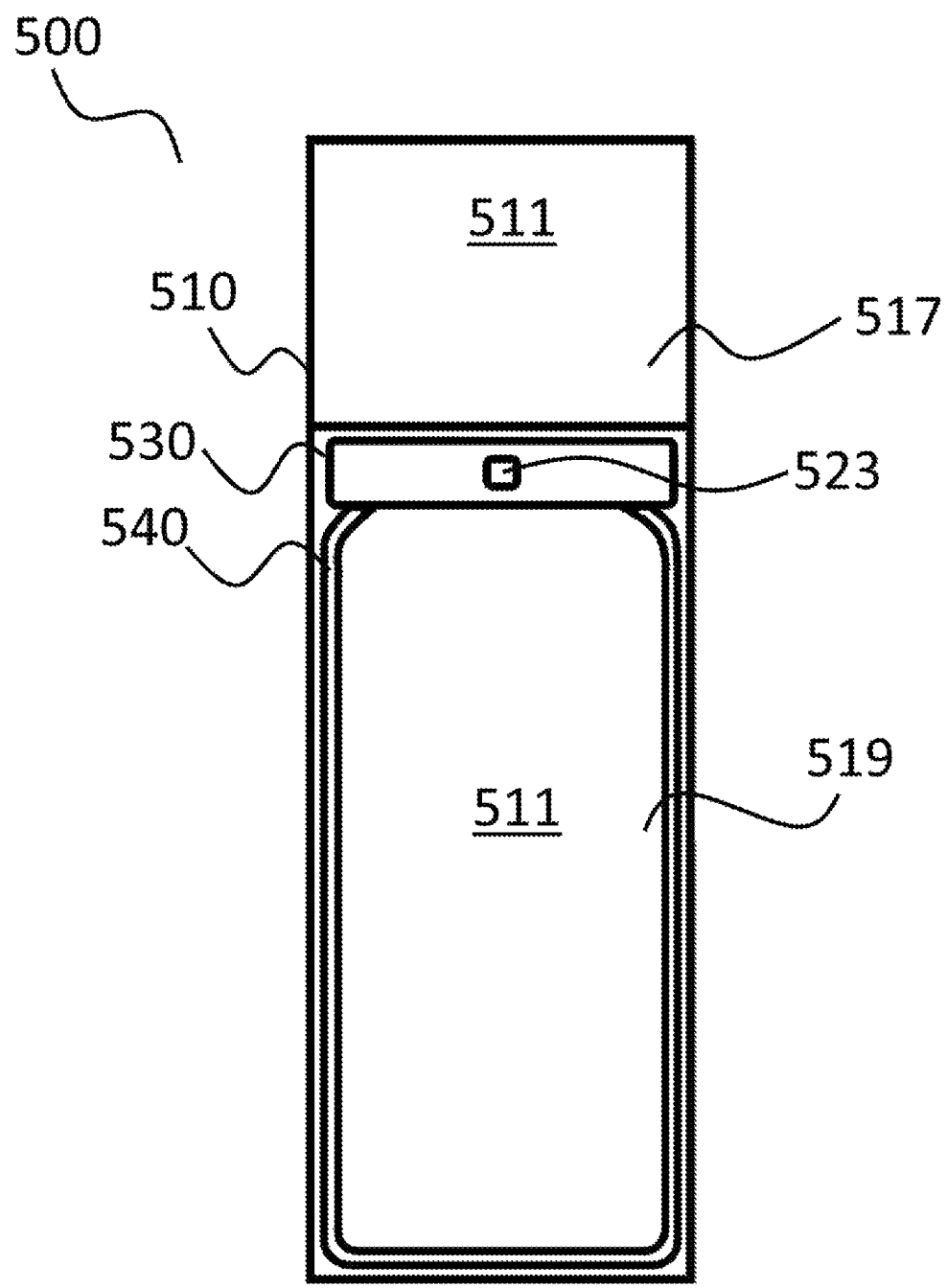
FIG. 6 depicts an orthogonal view of a fifth implementation of the temperature measuring and logging slide.

FIG. 6 shows another implementation, referred to as slide 500, in which the slide 500 comprises substrate 510, WISP 530. Substrate 510 has an upward facing outer surface area 511, a first surface area 517 that is frosted, and a second surface area 519 that is optically transparent. WISP 530 is comprised of a microchip processor 523 and an antenna 540. The power source for microchip processor 523 is harvested UHF waves that are externally generated. The WISP 530 further comprises a temperature sensor 524 that is in electronic communication with the microchip processor 523. Although slide 500 has a similar appearance to slide 400, the antenna 540 of slide 500 is positioned where the temperature sensor 440 of slide 400 is shown in FIG. 5—while the temperature sensor 524 of slide 500 is integrated into the WISP 530.

In some implementations the slide is further comprising labels for displaying printed information and graphics. In other implementations, the displayed information and graphics are printed directly onto the substrate. In other implementations, the displayed information and graphics are formed directly onto the substrate.

Although the invention has been described and illustrated with a certain degree of detail or with reference to one or more particular implementations, it is understood that the present disclosure has been made only by way of example. It should be understood that the invention is not intended to be limited to the particular forms disclosed. Furthermore, the invention is amenable to various modifications and alternative forms. Obvious variations and other various changes in the composition, combination, and arrangement of parts can be utilized to by those skilled in the art without departing from the spirit and scope of the invention, as herein disclosed and claimed.

The invention claimed is:

1. A temperature measuring and logging slide for receiving a mounted specimen, that measures the slide temperature and transmits the temperature data, for use with research and medical diagnostic instruments, comprising:

a rigid and transparent substrate, to be received by slide-using research and medical diagnostic instruments, devices, and equipment, having a shape that is substantially a flat rectangular prism comprising a volume enclosed by at least a first face, a second face, a third face, a fourth face, a fifth face, and a sixth face;

a WISP at least partially embedded in the volume of the substrate, wherein the WISP is further comprising an antenna, an integrated circuit, and a memory unit, wherein the WISP is powered wirelessly by an external device; and a temperature sensor, at least partially embedded in the substrate and in electronic communication with the WISP, wherein the temperature sensor measures temperature of the temperature measuring and logging slide.

2. The temperature measuring and logging slide of claim 1 wherein the substrate is further comprising:
a first section that is translucent; and
a second section that is transparent, wherein the second section is larger than the first and includes the center of the substrate.

3. The temperature measuring and logging slide of claim 1 wherein the substrate material of construction is selected from the group comprising glass, tempered glass, and laminated glass.

4. The temperature measuring and logging slide of claim 1 further comprising:
a displayed content, wherein the content is comprised of text or graphic.

5. The temperature measuring and logging slide of claim 4 wherein the displayed content is linked to a database containing information.

6. The temperature measuring and logging slide of claim 1 wherein the temperature sensor is completely embedded in the substrate.

7. The temperature measuring and logging slide of claim 1 wherein the WISP is attached to a label, and the label is attached to a surface of the substrate.

8. The temperature measuring and logging slide of claim 1 wherein the antenna is positioned along at least a first interior edge defining the substrate.

9. The temperature measuring and logging slide of claim 1 wherein the WISP communicates wirelessly with an external communications device.

10. A temperature measuring and logging slide for receiving a mounted specimen, that measures the slide temperature and transmits the temperature data, for use with research and medical diagnostic instruments, comprising:

a rigid and transparent substrate, to be received by slide-using research and medical diagnostic instruments, devices, and equipment, having a shape that is substantially a flat rectangular prism comprising a volume enclosed by at least a first face, a second face, a third face, a fourth face, a fifth face, and a sixth face, and further comprising a first section that is translucent and a second section that is transparent, wherein the second section is larger than the first and includes the center of the substrate;

a WISP comprising an antenna, an integrated circuit, and a memory unit, wherein the WISP is powered wirelessly by an external device, wherein the WISP is at least partially embedded in the substrate, and wherein the WISP communicates wirelessly with an external communications device; and a temperature sensor connected to and in electronic communication with the WISP, wherein the temperature sensor is at least partially embedded in the substrate, and further wherein the temperature sensor measures temperature of the temperature measuring and logging slide.

11. The temperature measuring and logging slide of claim 10 further comprising:
a displayed content, wherein the content is comprised of text or graphic.

12. The temperature measuring and logging slide of claim 10 wherein the displayed content is linked to a database containing information.

13. The temperature measuring and logging slide of claim 10 wherein the substrate material of construction is selected from the group comprising glass, tempered glass, and laminated glass.

14. The temperature measuring and logging slide of claim 10 wherein the temperature sensor is completely embedded in the substrate.

15. The temperature measuring and logging slide of claim 10 wherein the WISP is completely embedded in the substrate.

* * * * *